US011869317B2

(12) United States Patent
Weiss

(10) Patent No.: US 11,869,317 B2
(45) **Date of Patent: *Jan. 9, 2024**

(54) COOPERATIVE CARD WAGERING GAME

(71) Applicant: Matthew Weiss, New York, NY (US)

(72) Inventor: Matthew Weiss, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/870,048

(22) Filed: Jul. 21, 2022

(65) Prior Publication Data

US 2022/0358816 A1 Nov. 10, 2022

Related U.S. Application Data

(63) Continuation of application No. 17/198,571, filed on Mar. 11, 2021, now Pat. No. 11,430,302, which is a continuation of application No. 16/856,352, filed on Apr. 23, 2020, now Pat. No. 11,043,080.

(51) Int. Cl.
*G07F 17/32* (2006.01)

(52) U.S. Cl.
CPC ...... *G07F 17/3293* (2013.01); *G07F 17/3223* (2013.01); *G07F 17/3267* (2013.01)

(58) Field of Classification Search
CPC ............. G07F 17/3293; G07F 17/3223; G07F 17/3267; G07F 17/322
USPC ................................................ 463/11, 12, 13
See application file for complete search history.

(56) References Cited

U.S. PATENT DOCUMENTS

| | | | | |
|---|---|---|---|---|
| 5,934,675 | A | 8/1999 | Handelman et al. | |
| 5,975,529 | A | 11/1999 | de Keller | |
| 7,309,065 | B2 | 12/2007 | Yoseloff et al. | |
| 7,584,967 | B2 | 9/2009 | Webb et al. | |
| 7,618,043 | B1 | 11/2009 | Hayden | |
| 8,292,714 | B2 | 10/2012 | Kennedy | |
| 9,616,322 | B2 | 4/2017 | McKee et al. | |
| 9,875,622 | B2 | 1/2018 | Ventura | |
| 10,134,235 | B2 | 11/2018 | Litman | |
| 11,043,080 | B1 | 6/2021 | Weiss | |
| 2006/0226604 | A1 | 10/2006 | Saucier | |
| 2007/0205559 | A1* | 9/2007 | Webb | G07F 17/3293 273/292 |
| 2007/0241501 | A1* | 10/2007 | Kling | A63F 3/00157 273/292 |

(Continued)

OTHER PUBLICATIONS

Written Opinion of the International Searching Authority for PCT/US21/27022 established by the ISA/US completed on Jul. 15, 2021.

*Primary Examiner* — Pierre E Elisca

(74) *Attorney, Agent, or Firm* — Goldstein Law Offices, P.C.

(57) ABSTRACT

A method for playing a cooperative card wagering game for a plurality of players and a dealer using a customer cooperative wagering table and a deck of cards with each card having a numerical value, the cooperative wagering table having a dealer table edge, a community table edge, and a community line positioned therebetween, each player has an individual hand, and contributes a card to form a community hand by placing the card upon the community line, the players cooperate to maximize the value of the community hand, while also maximizing their respective individual hands, whereby the players cannot obtain a player win result if the community hand is less than the dealer's hand in value.

20 Claims, 13 Drawing Sheets

(56) References Cited

U.S. PATENT DOCUMENTS

| | | | | |
|---|---|---|---|---|
| 2008/0179830 | A1* | 7/2008 | Webb | A63F 3/00157 273/274 |
| 2008/0318652 | A1 | 12/2008 | Lima et al. | |
| 2009/0186676 | A1 | 7/2009 | Amaitis et al. | |
| 2009/0250875 | A1 | 10/2009 | Matanky | |
| 2010/0123288 | A1* | 5/2010 | Sparago | A63F 1/00 273/292 |
| 2011/0266747 | A1* | 11/2011 | Sparago | G07F 17/326 273/146 |
| 2012/0196665 | A1 | 8/2012 | Sparago | |
| 2012/0264495 | A1 | 10/2012 | Amaitis et al. | |
| 2013/0065658 | A1* | 3/2013 | Sparago | A63F 1/00 463/13 |
| 2018/0047255 | A1 | 2/2018 | Yee | |
| 2018/0330573 | A1* | 11/2018 | Wester | G07F 17/3248 |
| 2019/0206193 | A1* | 7/2019 | Amaitis | G07F 17/3267 |
| 2020/0134976 | A1* | 4/2020 | Wester | G07F 17/3218 |

* cited by examiner

| Player Win (44) | Player Push (46) | Player Loss (48) |
|---|---|---|
| Individual Hand > Dealer Hand<br>Community Hand ≥ Dealer Hand | Individual Hand > Dealer Hand<br>Community Hand < Dealer Hand | Individual Hand < Dealer Hand<br>Community Hand ≤ Dealer Hand |
| Individual Hand = Dealer Hand<br>Community Hand > Dealer Hand | Individual Hand < Dealer Hand<br>Community Hand > Dealer Hand | Individual Hand = Dealer Hand<br>Community Hand < Dealer Hand |
| | Individual Hand = Dealer Hand<br>Community Hand = Dealer Hand | |

FIG. 6A

42T

| # of Players | Dealer Draws Additional Card When Hand Is Equal to Or Less Than |
|---|---|
| 1 | 8 |
| 2 | 7 |
| 3 | 6 |
| 4 | 5 |
| 5 | 4 |
| 6 | 4 |
| 7 | 4 |

FIG. 6B

COOPERATIVE CARD WAGERING GAME

CROSS-REFERENCING

This application is a continuation of U.S. patent application Ser. No. 17/198,571, filed on Mar. 11, 2021, which is in turn a continuation of U.S. patent application Ser. No. 16/856,352, filed on Apr. 23, 2020, and issued as U.S. Pat. No. 11,043,080 on Jun. 22, 2021. The contents of said applications are relied upon and are incorporated herein by reference in their entirety.

TECHNICAL FIELD

The present disclosure relates generally to a card wagering game played using a novel physical apparatus. More particularly, the present disclosure relates to a cooperative card wagering game played using a custom cooperative wagering table.

BACKGROUND

Casino wagering games are tension-filled experiences in which the players are pitted against the dealer or against other players, often with money on the line. There is no incentive for a player to meaningfully interact with other players, who are little more than opponents. Cooperative wagering gaming provides a unique experience in which players are encouraged to work together for their mutual benefit.

There are certain examples of card games found within the prior art which feature pools of communal cards which can be shared by players to improve their individual hands. However, the communal card pools utilized in these examples are not the product of player cooperation, and are instead randomly dealt out by the dealer. These shared cards are utilized by the players to improve their own hands, and are used to further competition instead of cooperation.

A need therefore exists for a true cooperative card wagering game, in which players compete together against the dealer by actively choosing and contributing cards to form a community hand, with the goal of maximizing both the community hand as well as the individual hands of each player. Furthermore, this cooperative card wagering game is enhanced by a custom table with features adapted to facilitate and improve the cooperative aspects of the card wagering game.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is a cooperative card wagering game in which a plurality of players compete against a dealer both individually and as a community. Accordingly, the present disclosure provides a method for playing a cooperative card wagering game using a card deck, where each card in the deck has a corresponding numerical value. Each player is dealt a plurality of cards forming an individual hand, while the dealer is dealt a dealer's hand. Each player contributes a card from their individual hand to form a community hand, whereby the goal is to maximize the total numerical value of the community hand, as well as the total numerical value of the cards retained in each player's individual hand. Cooperation between the players is vital, as no players can obtain a player win game result if the community hand is less than the dealer's hand.

It is another aspect of an example embodiment in the present disclosure to provide a cooperative card wagering game which is played using a custom table. Accordingly, the present disclosure provides a custom cooperative wagering table comprising a playing surface with a community table edge, a dealer table edge, and a community line positioned therebetween. The community line divides the playing surface between a dealer area and a community area. The individual hands of each player are dealt directly to the community area, while the dealer's hand is placed in the dealer's area proximate to the dealer's table edge. The community cards contributed by each player are placed on the playing surface in contact with the community line, thus clearly distinguishing the cards of the community hand from the individual hands and the dealer's hand.

It is yet another aspect of an example embodiment in the present disclosure to provide a cooperative card wagering game which can be played electronically. Accordingly, the present disclosure provides a cooperative card game system comprising a plurality of user game devices operably connected to a game control server, which can be played remotely over a data communication network as well as within a gaming venue. The user game devices are used to execute a multiplayer card game application which replicates the cooperative card wagering game, and provides a cooperative game interface adapted to facilitate cooperation between the players in recommending and selecting the community cards for the community hand.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

FIG. 6A is a table depicting combinations of individual hand results and community hand results which produce the player win, player push, and player loss game results, in accordance with an embodiment in the present disclosure.

FIG. 6B is a table depicting draw thresholds in relation to the quantity of players participating in the cooperative card wagering game, in accordance with an embodiment in the present disclosure.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1:
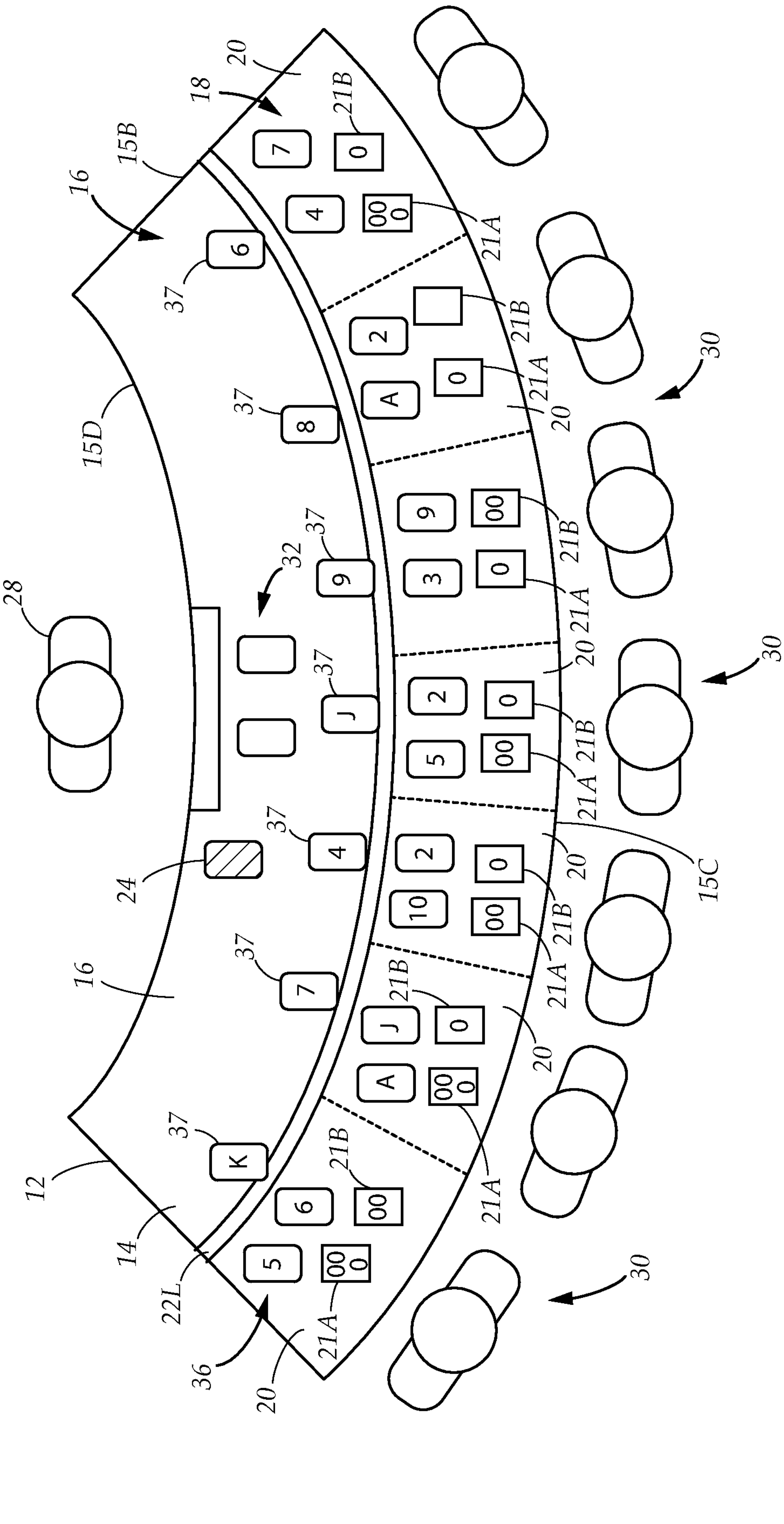
FIG. 1 is a diagrammatical top view of a cooperative card wagering game being played by a plurality of players and a dealer using a cooperative wagering table, the cooperative wagering table having a playing surface divided between a dealer area and a community area by a community line, in accordance with an embodiment in the present disclosure.

FIG. 1 illustrates a cooperative card wagering game, played by a plurality of players 30 and a dealer 28, using a card deck 24. In a preferred embodiment, the card deck 24 represents a conventional deck of playing cards comprising fifty-two cards, and up to seven players 30 may participate simultaneously. Each of the cards corresponds to a face card, a number card, or an ace, and has a numerical value from a range of zero to ten. Each face card has a numerical value of zero, while each number card has a numerical value of between two and ten. Each ace card has a numerical value of one.

In one embodiment, the cooperative card wagering game is played using a custom cooperative wagering table 12. The cooperative wagering table 12 has a substantially planar playing surface 14 upon which the cards are placed. The playing surface 14 has a dealer table edge 15D and a community table edge 15C. The playing surface 14 further has a community line 22L, which is positioned between the community table edge 15C and the dealer table edge 15D. In certain embodiments, the playing surface 14 further has a first end 15A and a distally oriented second end 15B which extend between the community and dealer table edges 15C, 15D. The community line 22L defines a dealer area 16 between the dealer table edge 15D and the community line 22L, and defines a community area 18 between the community table edge 15C and the community line 22L. The players 30 are positioned along the community table edge 15C, while the dealer 28 is positioned along the dealer table edge 15D. The community area 18 may be further divided between a plurality of player areas 20 for each of the players 30. The playing surface 14 further has one or more wagering areas 21A, which allow wagers to be placed thereon, as well as one or more side wager areas 21B. The side wager areas 21B allow side bets and side wagers to be placed thereon by each player 30. The wagering areas 21A and side wager areas 21B may be positioned within either the dealer area 16 or the community area 18. In certain embodiments, each player area 20 may contain a separate wagering area 21A and side wager area 21B, for use by the player 30 associated with the player area 20. The playing surface 14 may be rectangular, circular, elliptical, arcuate, or any shape that allows the player areas 20 to be evenly spaced along the community table edge 15C, while also allowing the dealer 28 to access the player areas 20 to deal and retrieve cards. In certain embodiments, the player areas 20 are marked off or otherwise delineated by borders between adjacent player areas 20.

In one embodiment in which the playing surface has an arcuate shape, the dealer table edge 15D and the community table edge 15C each have a length, and the length of the dealer table edge 15D is shorter than the length of the community table edge 15C. The dealer table edge 15D has a concave configuration, whereas the community table edge 15C has a convex configuration. The players 30 positioned along the community table edge 15C face inwardly towards the dealer table edge 15D and the dealer 28. The community line 22L, is positioned between and substantially parallel with the dealer and community table edges 15D, 15C, is likewise arcuate in shape. The arcuate shape of the playing surface 14 and the community line 22L provides each player 30 positioned along the community table edge 15C with an unobstructed view of any portion of the community line 22L. For example, a player 30 positioned by the first end 15A of the playing surface 14 is provided an unobstructed view of the entire community line 22L from the first end 15A to the second end 15B, thanks to the arcuate and convex configuration of the community line 22L and the community table edge 15C.

Figure 2A:
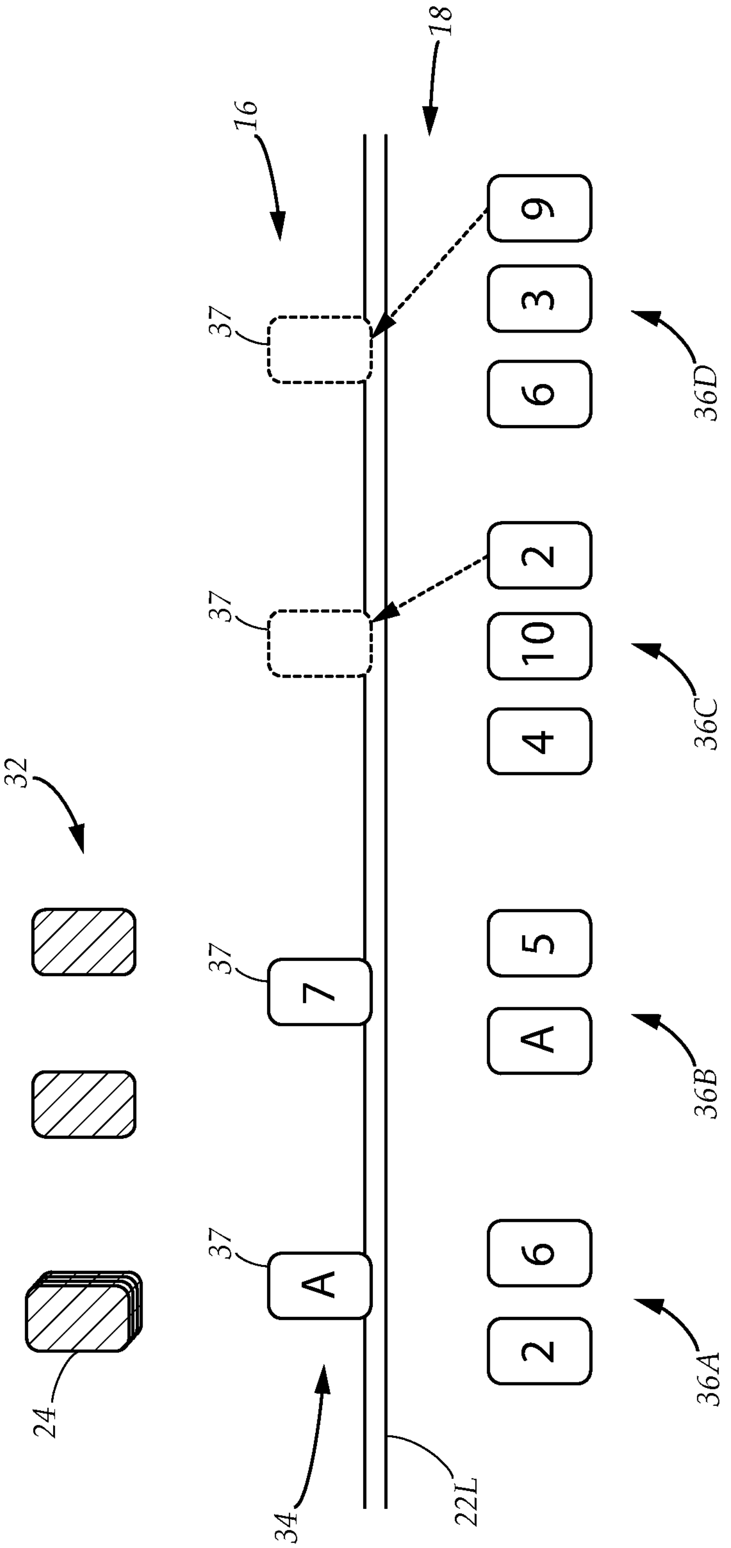
FIG. 2A is a diagrammatical top view of the cooperative card wagering game in progress, with each player contributing a card to form a community hand, whereby the cards of the community hand are placed in contact with the community line, in accordance with an embodiment in the present disclosure.

At the start of the cooperative wagering game, each player 30 places a wager. The wager corresponds to an amount of currency or game points, and may be represented using chips, tokens, or other suitable markers. Each player 30 may therefore place a wager directly within the wagering area 21A. Turning to FIG. 2A while continuing to refer to FIG. 1, the cooperative card wagering game requires the players 30 to compete against the dealer 28 both individually and cooperatively as a community. In a preferred embodiment, the players 30 cannot achieve a successful game result if the dealer 28 prevails against the community. Cooperation between the players 30 forms a vital strategic element of the cooperative card wagering game.

Each player 30 is dealt an individual hand 36 comprising three cards drawn from the deck 24 by the dealer 28, while the dealer 28 draws a dealer's hand 32 initially comprising two cards from the deck 24. Each card within the deck 24 has a first surface which indicates the identity of the card and its numerical value, and a distally oriented second surface. In a preferred embodiment, the cards of the dealer's hand 32 are dealt with the second surface of the card hidden from view, such as by placing the first surface of each card in contact with the playing surface 14, thus obscuring the numerical value of the dealer's hand 32. Conversely, in a preferred embodiment, the cards for each individual hand 36 are dealt with the first surface of each card exposed, thus revealing the numerical value of each individual hand 36 to all the players 30. The cards may be dealt to each of the players 30 according to a dealing order. Any dealing order commonly employed in card-based games may be utilized for the cooperative card wagering game. For example, the dealing order may involve each player 30 being dealt one card in a sequence from the dealer's left to the dealer's right or vice versa, along the community table edge 15C, until the individual hand 36 of each player 30 contains three cards.

Figure 2B:
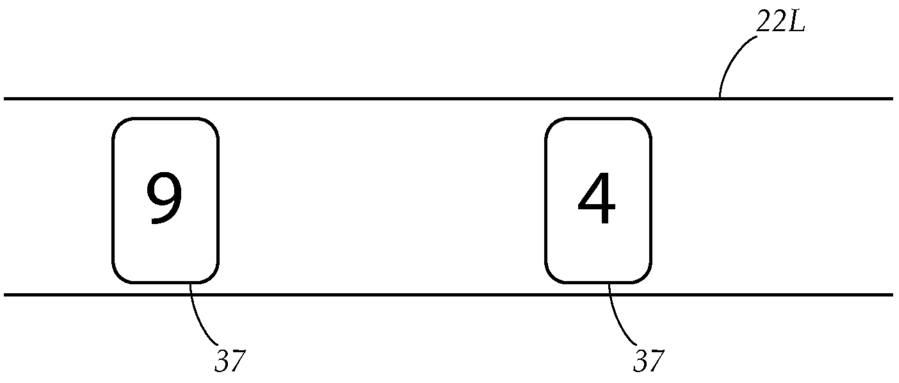
FIG. 2B is a diagrammatical top view of a portion of the playing surface depicting a variant of the community line, in accordance with an embodiment in the present disclosure.
Figure 2C:
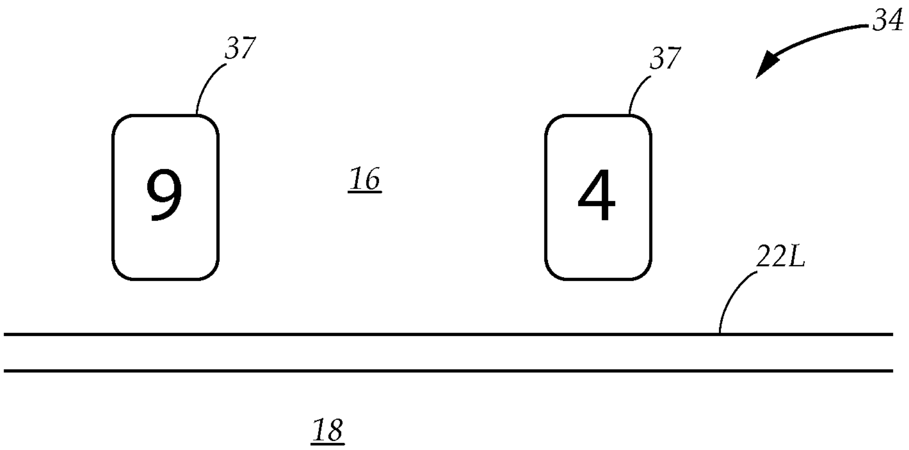
FIG. 2C is a diagrammatical top view of a portion of the playing surface, depicting community cards placed in the dealer area proximate to the community line, in accordance with an embodiment in the present disclosure.

Each player 30 must select one of the cards from said player's individual hand 36 to be a community card 37, and then contribute the community card 37 to form a community hand 34. As such, the quantity of the community cards 37 within the community hand 34 is equal to the quantity of participating players 30. The contributions to the community hand 34 may follow a sequence which mirrors the dealing order. In a preferred embodiment, each player 30 takes their selected community card 37 and places the card 37 upon the playing surface 14 in contact with the community line 22L, while the remaining two cards constituting the individual hand 36 remain within the community area 18, or within the player area 20 where appropriate. The community line 22L is used to guide the placement of the community cards 37 by the player 30 to ensure that each player 30 has an unobstructed view of the community cards 37. Furthermore, the community line 22L clearly distinguishes the community cards 37 which make up the community hand 34, from the cards remaining in the individual hands 36 of each player 30. In other embodiments, each community card 37 may be positioned in contact with the community line 22L such that the community card 37 rests within the dealer area 16 but not the community area 18. In certain embodiments (as shown in FIG. 2B), the community line 22L is sufficiently wide to accommodate the community cards 37 so that the community cards 37 rest upon the community line 22L without contacting either the dealer area 16 or the community area 18. Alternatively, as shown in FIG. 2C, the community card 37 may be positioned entirely within the dealer area 16 while remaining proximate to the community line 22L. Referring to FIG. 2C as well as FIG. 1, the cards of the community hand 34 may be distinguished from those of the dealer's hand 32 by positioning the community hand 34 closer in relation to the community line 22L, than to the dealer table edge.

Figure 3:
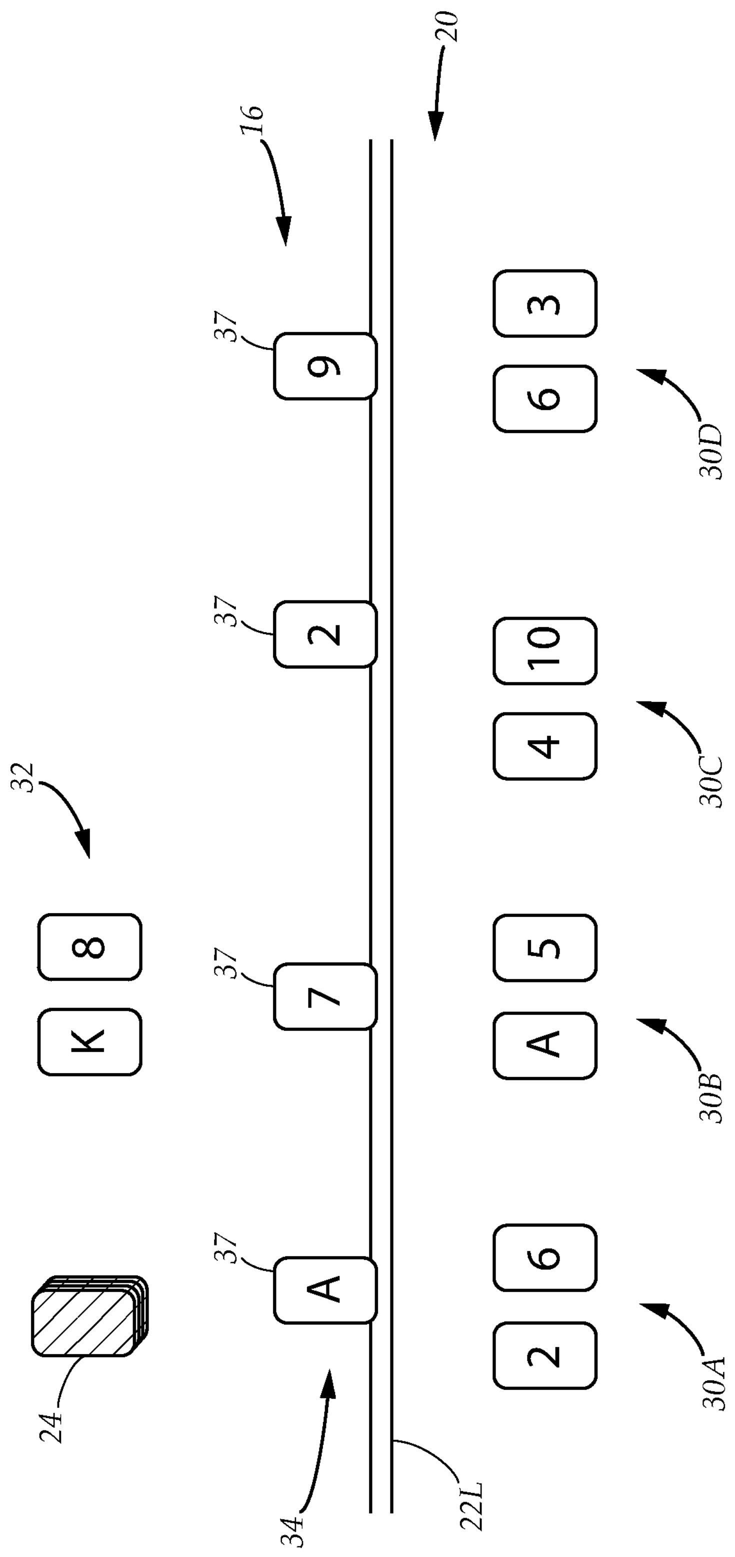
FIG. 3 is a diagrammatical top view depicting the cooperative card wagering game in progress, where the cards of the dealer's hand have been revealed in response to the completion of the community hand, in accordance with an embodiment in the present disclosure.

Returning to FIG. 1 and FIG. 3, when each player 30 selects a community card 37 for contribution to the community hand 34, the object is to ensure that the numerical value of the community hand 34 exceeds the numerical value of the dealer's hand 32, and that the numerical value of the player's individual hand 36 equals or exceeds the numerical value of the dealer's hand 32. The total numerical value of the relevant hand is determined by adding together the numerical values of the cards within the dealer's hand 32, community hand 34, or individual hand 36 as appropriate, and retaining only the rightmost digit of the resulting numerical value. For example, a hand containing two numerical cards each with the numerical value of nine, has a total numerical value of eight. Although the sum of nine and nine totals eighteen, only the rightmost digit is used for the total numerical value. As the numerical value of the dealer's hand 32 is hidden from the players 30, coordination and cooperation between the players 30 greatly increases the chance that the total numerical value of the community hand 34 will exceed the total numerical value of the dealer's hand 32. In certain embodiments, the players 30 are given a chance to discuss the selection of the community cards which will form the community hand 34, which may be limited in duration via a time limit.

Once the community hand 34 is complete, the dealer's hand 32 is revealed. First, the community hand 34 is compared to the dealer's hand 32 to determine a community result. The community result may either be a community win, a community tie, or a community loss, depending on whether the total numerical value of the community hand 34 is greater than, equal to, or less than the total numerical value of the dealer's hand 32. Next, an individual result is determined for each player 30 by comparing the numerical value of the player's individual hand 36 with the numerical value of the dealer's hand 32, resulting in either an individual win, an individual tie, or an individual loss. Turning to FIG. 6A, while also referring to FIG. 1 and FIG. 3, a game result for each player 30 is determined, based on both the community result and the individual result for the player 30. In a preferred embodiment, the game result corresponds to either a player win 44, a player push 46, or a player loss 48. If the game result is a player win 44, the player 30 is awarded a certain amount of currency or points. If the game result is a player push 46, the wager is returned to the player 30. If the game result is a player loss 48, the player's wager is forfeited. For example, the dealer's hand 32 may have a total numerical value of eight, while the community hand 34 may include an ace, a "seven", a "two", and a "nine", resulting in a total numerical value of nine. The community result is therefore a community win. Individual hand "A" 30A may include a "two" and a "six", resulting in a total numerical value of eight, resulting in an individual loss. The player 30 holding individual hand "A" therefore achieves a game result of a player push 46.

In order for a player 30 to achieve the player win 44 game result, the individual result and community result must correspond to either: an individual win and a community win or community tie; or an individual tie and a community win. The player 30 will achieve the player push 46 game result if the individual result and the community result correspond to: an individual win and a community loss; an individual loss and a community win; or an individual tie and a community tie. The player 30 will achieve the player loss 48 game result, if the individual result and the community result correspond to: an individual loss and a community tie or community loss; or an individual tie and a community loss. Once the game result has been determined for each player 30, the cooperative card wagering game ends. Note that in certain embodiments, various alternative combinations of community results and individual results may be used to determine the game results in accordance with the principles of the present disclosure.

Figure 4:
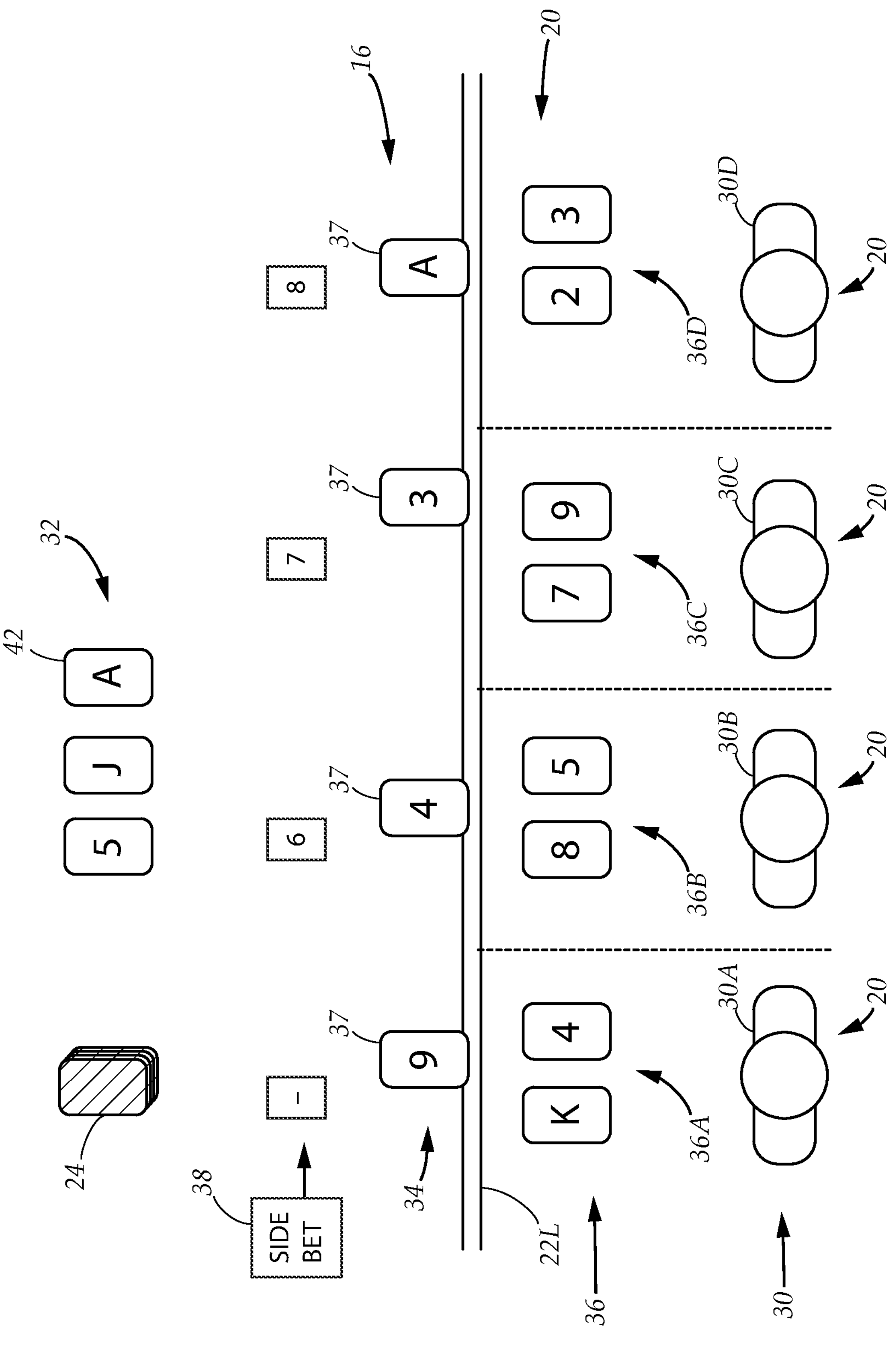
FIG. 4 is a diagrammatical top view of another cooperative card wagering game in progress, where an additional dealer card has been drawn and added to the dealer's hand, in accordance with an embodiment in the present disclosure.

Referring to FIG. 4 while also referring to FIG. 1, in certain embodiments, each player 30 may also place a side bet 38 at the start of the cooperative card wagering game, along with a side wager. The side bet 38 is a prediction by the player 30 of a side outcome within the cooperative card wagering game, to be resolved alongside the game result. As with the wager, the side wager corresponds to chips, tokens, or other representations or currency and/or points. In a preferred embodiment, the side outcome may correspond to the numerical value of the dealer's hand 32, and the player 30 wins the side bet 38 if the player's prediction matches the side outcome. If the side bet 38 does not match the side outcome, the player 30 loses the side bet 38 and forfeits the side wager. However, if the player 30 successfully predicts the side outcome, the player 30 will receive a side bet payout. In certain embodiments, the side wagering area 21B may include a plurality of defined zones, with each zone identifying one of the possible side outcomes. The player 30 places the side wager within the zone which corresponds to the side outcome predicted by the player 30. For example, the side wager area 21B may be divided into ten zones, each corresponding to one of the possible numerical values of the dealer's hand 32.

Referring to FIG. 6B while also referring to FIG. 4, in one embodiment, after the dealer's hand 32 has been revealed but before the community result is determined, an additional dealer card 42 may be added to the dealer's hand 32 to add an element of variability. The total numerical value of the dealer's hand 32 is compared against a draw threshold 42T, and the additional card 42 is added to the dealer's hand 32 if the total numerical value is less than or equal to the draw threshold 42T. In a preferred embodiment, the draw threshold 42T is dependent upon the quantity of players 30 participating in the cooperative card wagering game. Increasing the quantity of participating players 30 will lower the draw threshold 42T and increase the likelihood that the dealer 32 will draw an additional card 42, thus increasing the probability that the total numerical value of the dealer's hand 32 will remain relatively low, making it easier to achieve community or individual wins. For example, the draw threshold 42T may have a value of: eight when there is one player 30, seven when there are two players, six when there are three players, five when there are four players, and four when there are five players or more.

Figure 5:
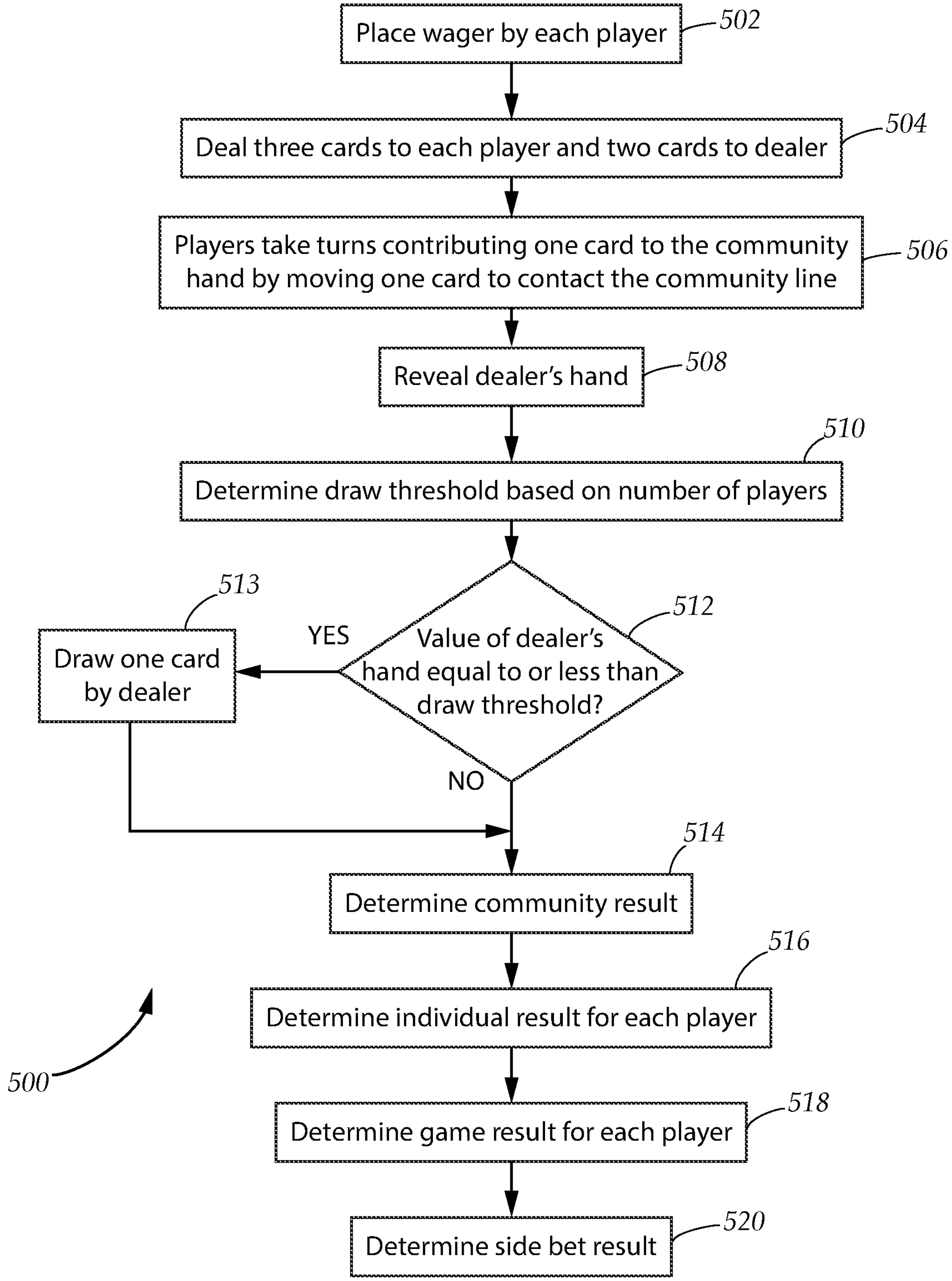
FIG. 5 is a flowchart depicting an exemplary cooperative card wagering game process, in accordance with an embodiment in the present disclosure.

Turning to FIG. 5 and FIG. 4, while also referring to FIG. 1, an example cooperative card wagering game process 500 is shown, and the principles of the cooperative card wagering game will be explained in the context of a sample game with four players 30 as illustrated in FIG. 4. The cooperative card wagering game begins at step 502, and each of the players 30 places a wager. Each of the players 30 may also choose to place a side bet 38. In the present example, Player "A" chooses not to place a side bet 38, while Players "B", "C", and "D" each place a side bet 38 which attempts to predict a side outcome corresponding to the total numerical value of the dealer's hand 32. Next, at step 504, the dealer 28 distributes three cards from the deck 24 to each player 30 to create each individual hand 36, and takes two cards from the deck 24 to form the dealer's hand 32. The individual hand 36A of Player "A" 30A contains a face card, a "nine", and a "four"; the individual hand 36B of Player "B" 30B contains a "four", a "five", and an "eight"; the individual hand 36C of Player "C" 30C contains a "three", a "seven", and an "nine"; and the individual hand 36D of Player "D" 30D contains an "ace", a "two", and a "three".

At step 506, each player 30 selects one of the cards in the player's individual hand 36 as a community card 37, and contributes the selected community card 37 to the community hand 34. The players "A", "B", "C", and "D" contribute a "nine", a "four", a "three", and an "ace" respectively to the community hand 34, resulting in the community hand 34 having a total numerical value of "seven". Each player 30 places their selected community card 37 in contact with the community line 22L, simultaneously distinguishing the community card 37 from the cards remaining within the individual hands 36 and providing every player 30 with an unobstructed view of the community cards 37. Once the community hand 34 is complete, the dealer's hand 32 is revealed at step 508. In the present example, the dealer's hand 32 includes a "five" and a face card, for a total numerical value of five. Referring to FIG. 6B while continuing to refer to FIGS. 1, 4, and 5, at step 510, the draw threshold 42T is determined based on the quantity of players 30. As there are four players, the draw threshold corresponds to "five". Next, at step 512, the total numerical value of the dealer's hand 32 is compared with the draw threshold 42T in order to determine if the dealer 28 will draw an additional dealer card 42. As the total numerical value of the dealer's hand is "five", which is equal to or less than the draw threshold 42T of "five", the process proceeds to step 513 and the additional dealer card 42 is added to the dealer's hand 32. In the present example, the additional dealer card 42 is revealed to be an "ace" card. If the total numerical value of the dealer's hand 32 was greater than the draw threshold 42T, the process would instead proceed from step 512 directly to step 514.

At step 514, the total numerical value of the dealer's hand 32 is compared to the total numerical value of the community hand 34 to determine the community result. As the additional dealer card 42 is an "ace" card with a numerical value of "one", the total numerical value of the dealer's hand 32 is increased to "six". This is less than the total numerical value of the community hand 34, which is "seven". The community result is therefore a community win. Next, at step 516, the total numerical value of each individual hand 36 is compared with total numerical value of the dealer's hand 32 to determine the individual result for each player 30. In the present example, player "A" 30A, player "B" 30B, and player "D" 30D each have individual hands 30 which have total numerical values which are less than the total numerical value of the dealer's hand 32, and therefore each of said players obtains an individual loss as the individual result. The total numerical value of the individual hand 36C of player "C" 30C is higher than the total numerical value of the dealer's hand 32, resulting in an individual win as the individual result of said player 30C.

Referring to FIGS. 4, 5, and 6A, once both the community result and the individual results for each player 30 have been determined, the game result is determined for each player 30 at step 518. For Player "A" 30A, Player "B" 30B, and Player "D" 30D, the community win combined with the individual loss produces the player push 46 game result. However, for Player "C" 30C, the community win combined with the individual win produces the player win 44 game result. Player "C" is awarded a payout, and the wagers placed by each player 30 obtaining the player push 46 game result are not forfeited.

At step 520, all side bets 38 are resolved, by comparing the prediction of each side bet 38 with the side outcome, which is the total numerical value of the dealer's hand 32. In the present example, amongst the side bet predictions made by Player "B" 30B, Player "C" 30C, and Player "D" 30D, only the prediction of "six" made by Player "B" matches the total numerical value of the dealer's hand 32 of "six". Therefore, the side wagers placed by Player "C" and Player "D" are forfeited, while Player B" is awarded a side payout. The side bet therefore provides each player 30 with the opportunity to win currency or points even if the game result is unfavorable to the player 30.

Payouts and side payouts are made in the form of currency or points, and the amount of the payouts and side payouts may be determined using any method employed in wagering games. For example, payouts and side payouts may be increased or decreased in proportion to the likelihood, or odds, of the game result or side outcome occurring. In one example embodiment, the amount of a standard payout may be calculated as a ratio of 1:2 for every point or unit of currency of the wager, but is increased to a ratio of 1:1 if the community and individual results are a community win and individual win respectively.

Figure 7A:
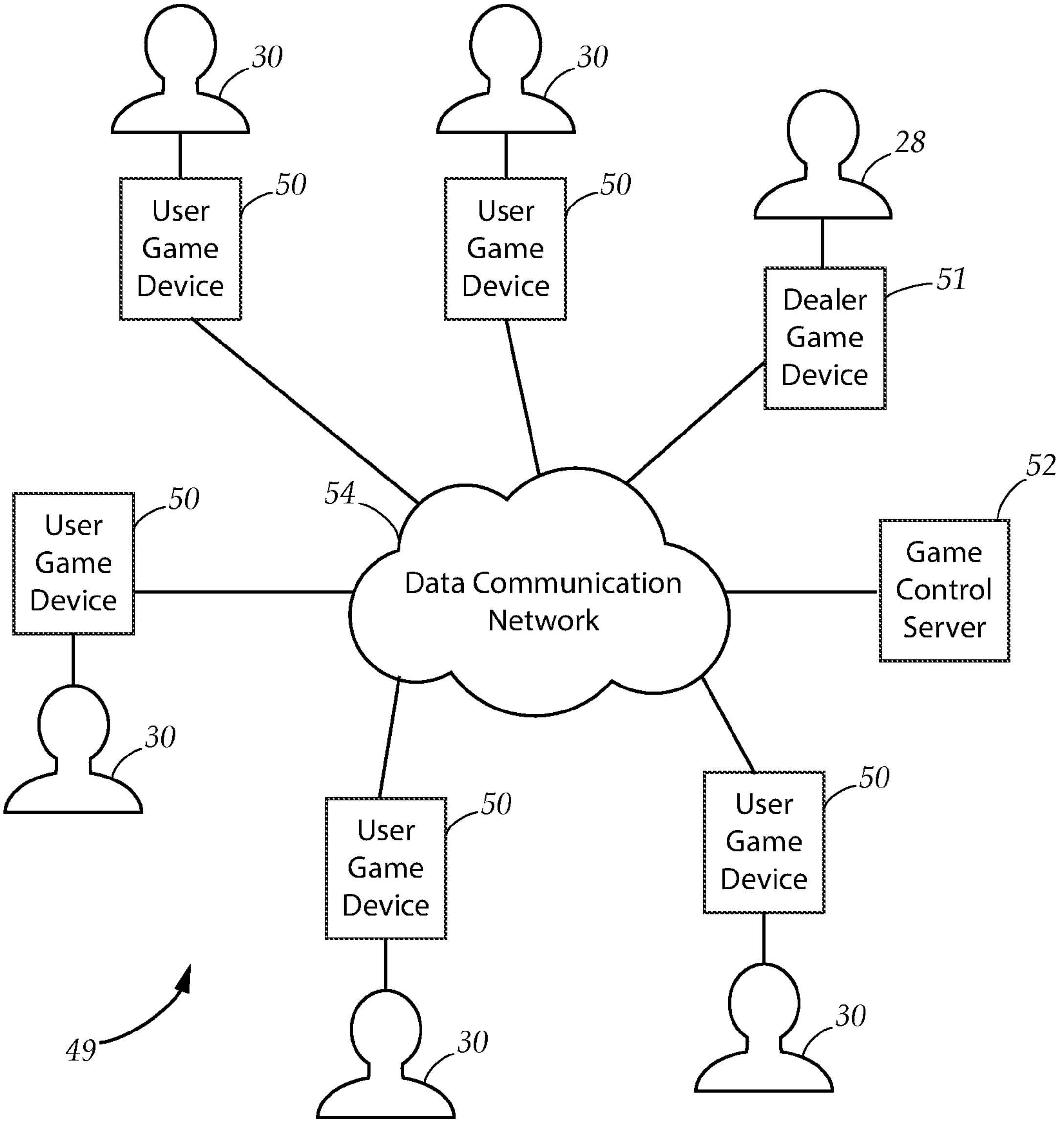
FIG. 7A is a block diagram depicting an exemplary cooperative card game system for playing the cooperative card game electronically over a digital communication network, in accordance with an embodiment in the present disclosure.
Figure 7B:
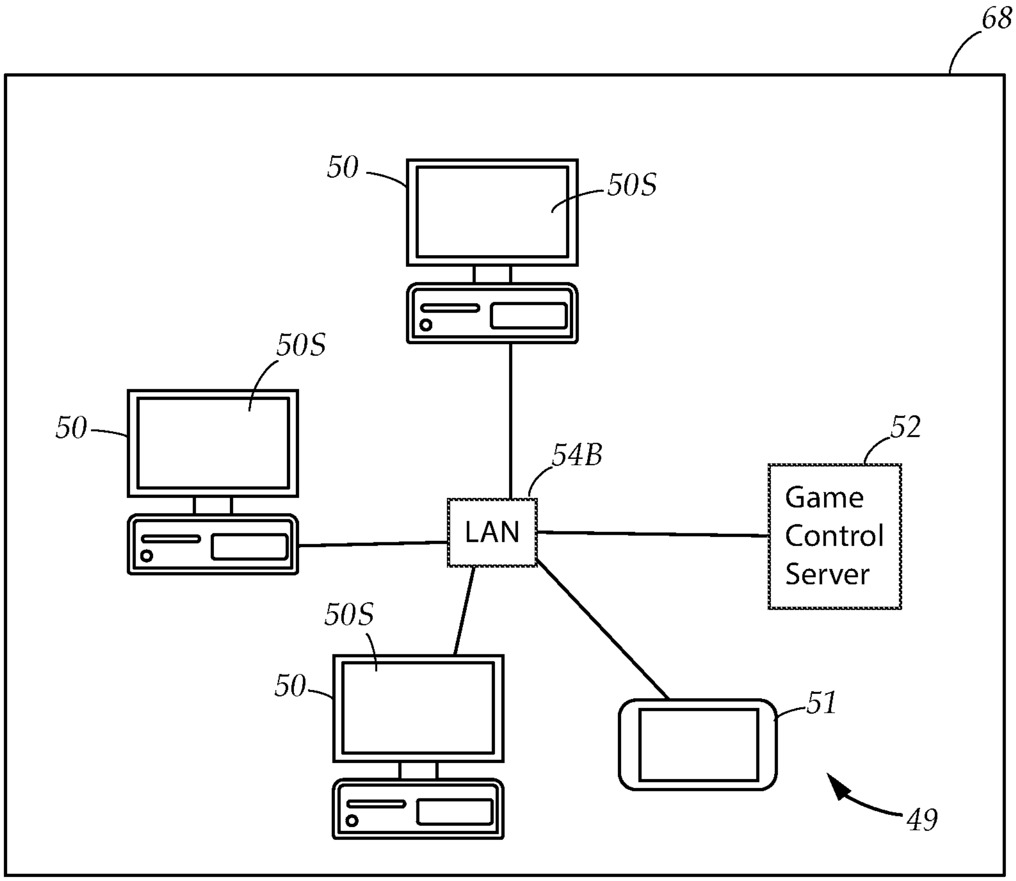
FIG. 7B is a block diagram depicting an exemplary cooperative card game system for playing the cooperative card wagering game within a gaming venue, in accordance with an embodiment in the present disclosure.
Figure 7C:
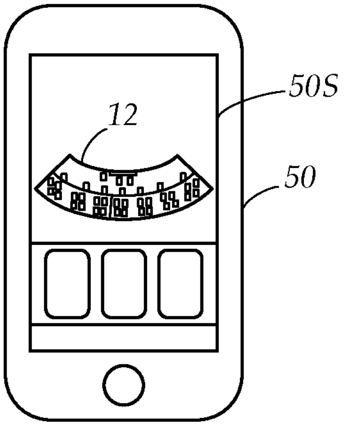
FIG. 7C is a diagrammatical front view of an exemplary user game device with an output screen, which is configured to execute a multiplayer card game application in accordance with an embodiment in the present disclosure.
Figure 8:
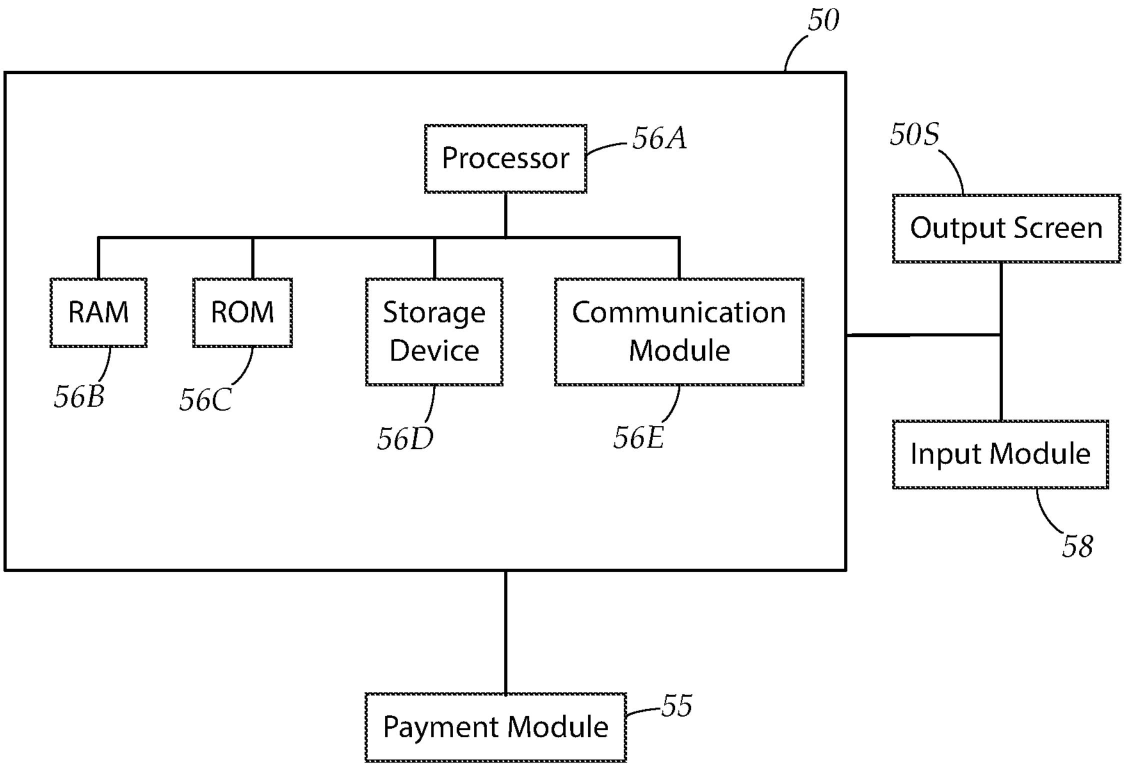
FIG. 8 is a block diagram depicting an example architecture of the user game device, in accordance with an embodiment in the present disclosure.

Turning now to FIG. 7A, FIG. 7C, and FIG. 8, the cooperative card wagering game may be played in computerized form using a cooperative card game system 49. In one embodiment, the cooperative card game system 49 comprises a plurality of user game devices 50 and a game control server 52. The user game devices 50 and the game control server 52 are operably connected via a data communication network 54 such as the Internet. Each user game device 50 allows one player 30 to access the cooperative card game system 49, and may be implemented using a personal computer, a mobile phone, tablet, laptop, or other suitable computing device. Each user game device 50 is adapted to execute a multiplayer card game application. In one embodiment, the user game device 50 comprises a processor 56A, a RAM 56B, a ROM 56C, and a storage device 56D. The user game device 50 further has an output screen 50S capable of displaying game graphics, an input module 58 such as a touch sensor, controller, or other input device adapted to receive game commands as user inputs, and a communication module 56E adapted to communicate with other user game devices 50 and the game control server 52. In certain embodiments, the cooperative card game system 49 may have a dealer game device 51 which is substantially similar to the user game device 50, which allows a dealer 28 to access the cooperative card game system 49 and perform dealer actions necessary to play the cooperative card wagering game. The game control server 52 is adapted to arbitrate the multiplayer card game application between the various user game devices 50, and may also be adapted to automate the dealer actions in place of a live dealer 28.

Figure 9A:
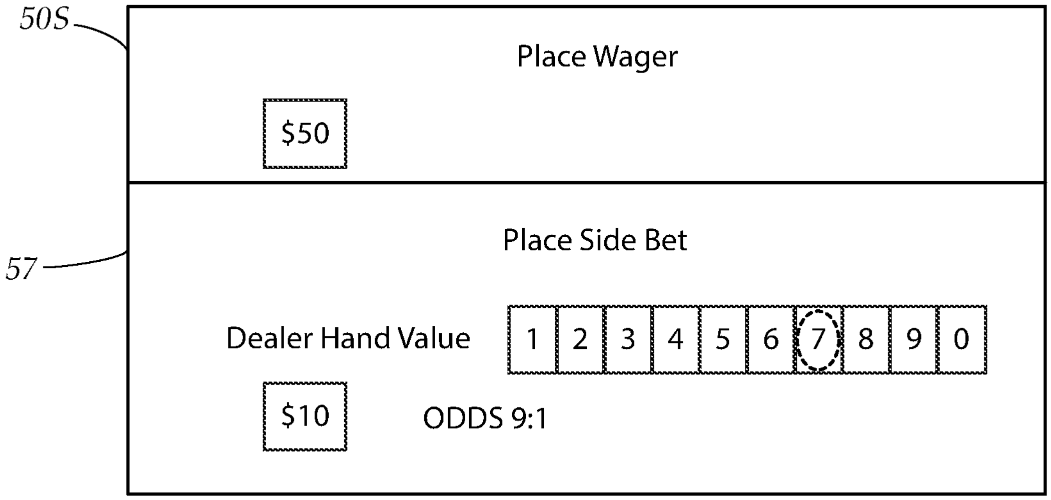
FIG. 9A is a block diagram showing an exemplary wagering interface, in accordance with an embodiment in the present disclosure.

Referring to FIG. 1, FIG. 7A, FIG. 7C, and FIG. 8, the multiplayer card game application substantially replicates the process (as shown in FIG. 5) of playing the cooperative card wagering game, by electronically recreating the card deck 24, and allowing electronic representations of the cards to be dealt to the players 30. The output screen 50S of each user game device 50 may also display a virtual representation of the playing surface 14 of the cooperative wagering table 12, along with graphical depictions of the individual hands 36, the community hand 34, the community line 22L, and the dealer's hand 32. Referring to FIG. 9A and FIG. 7A, the multiplayer card game application may present each player 30 with a wagering interface 57 which allows the player 30 to place wagers and side bets at the start of the cooperative card wagering game.

Figure 9B:
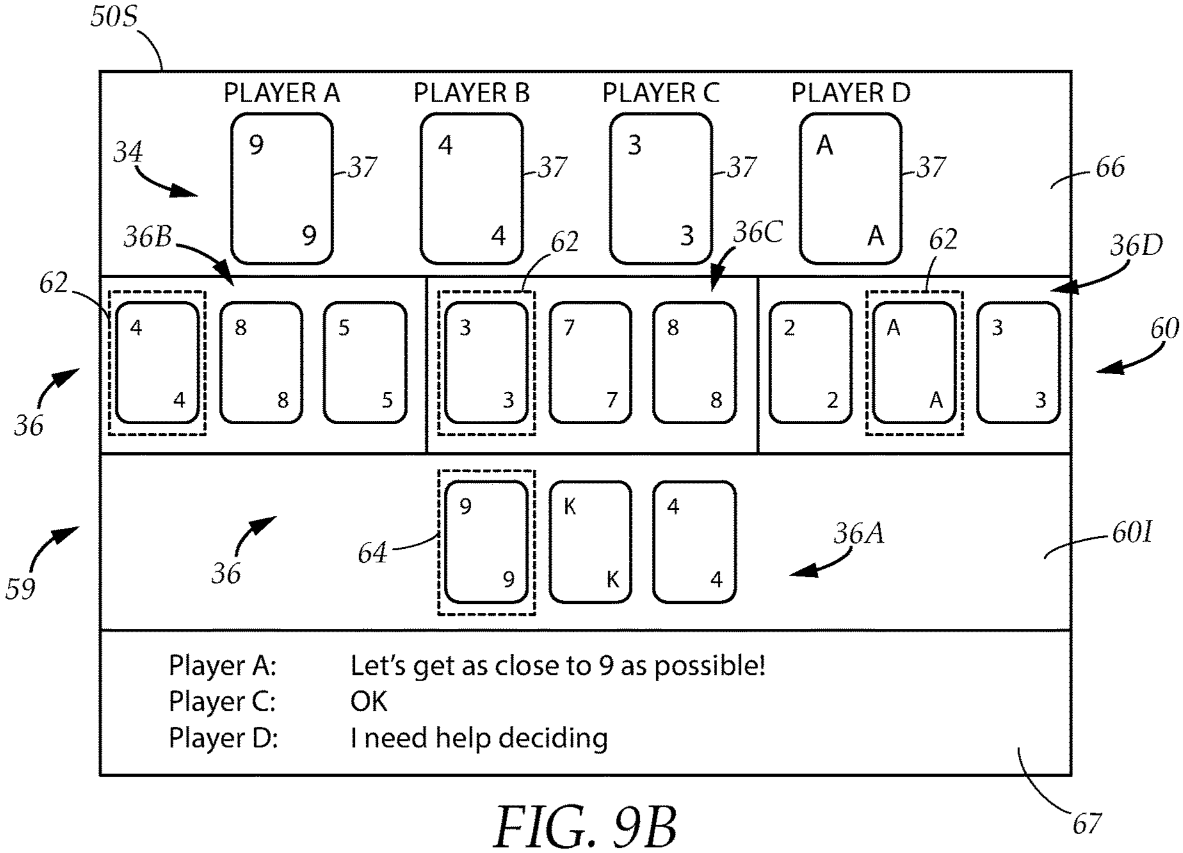
FIG. 9B is a block diagram showing an exemplary cooperative gaming interface, in accordance with an embodiment in the present disclosure.

Referring to FIG. 9B and FIG. 7A, the multiplayer game application may present each player 30 with a cooperative game interface 59 via the output screen 50S, comprising an individual player hand display 60I showing the individual hand 36 of the player associated with the user game device 50, a plurality of player hand previews 60 each showing the individual hands 36 of the other players 30, and a community hand preview 66 which displays the community hand 34. The player hand preview 60 allows each player 30 to make a community card selection 62 of one of the cards in the individual hands 36 of the other players 30, thus sending a recommendation to the other player to contribute the selected card to the community hand 34. The individual player hand display 60I may mark each card recommended by another player 30 as a community card recommendation 64. In the present example, the individual player hand display 60I shows the individual hand 36A of Player "A", while the player hand preview 60 displays the individual hands 36B, 36C, 36D of Players "B", "C", and "D" respectively. To further facilitate cooperation between the players 30, the cooperative game interface 59 may further comprise a chat interface 67 which allows each player to communicate with the other players 30. Communication between the players 30 may be carried out via text chat, as well as by voice or video chat, and the user game device 50 may be configured with the necessary microphone, camera, or other input devices as required. Each player may select one of the cards within the individual player hand display 60I as the community card 37, and the selected community card 37 will be removed from the individual player hand display 60I and be displayed within the community hand preview 66.

Figure 9C:
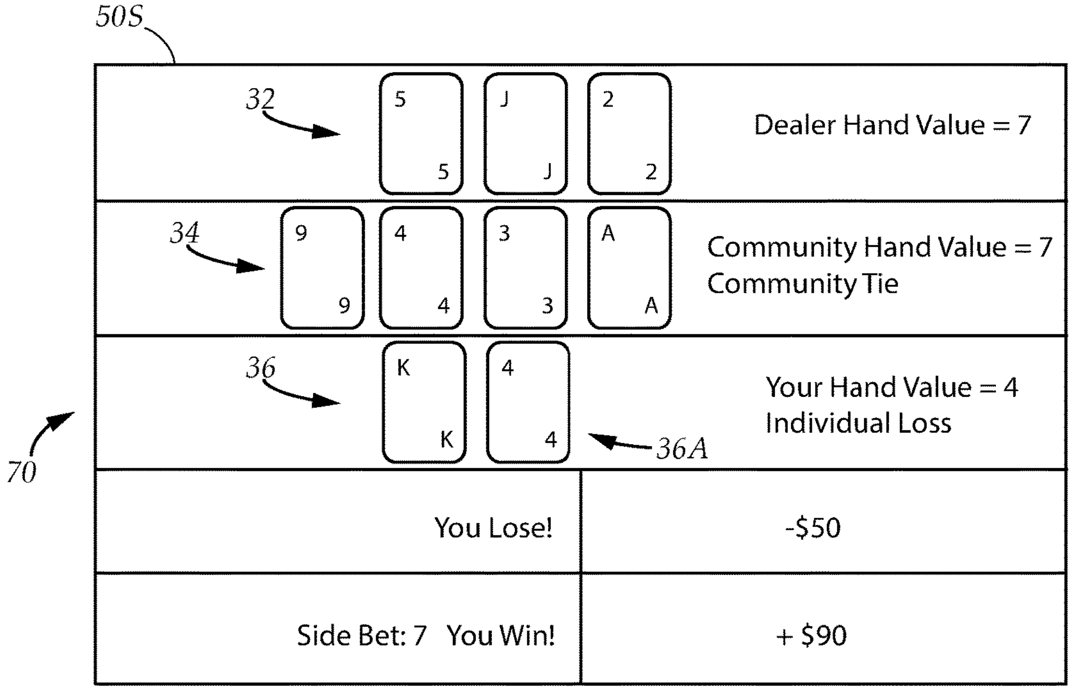
FIG. 9C is a block diagram showing an exemplary result interface, in accordance with an embodiment in the present disclosure.

Turning to FIG. 9C while also referring to FIG. 7A and FIGS. 9A-B, the multiplayer card game application may be adapted to display a result interface 70 via the output screen 50S of the user game device 50, which summarizes the relevant results. Once the community hand 34 is complete, the multiplayer game application reveals the dealer's hand 32 and draws an additional card if applicable, before proceeding to determine the community result, the individual result and game result for each player, and the outcomes of any side bets as appropriate. In one embodiment, the result interface 70 may display the dealer's hand 32 along with the community hand 34 and the individual hand 36 of the player 30 associated with the user game device 50. In the present example, the result interface 70 indicates that the community result is a community tie, while the individual result and game result for Player "A" is an individual loss, and a player loss respectively. The wager amount of $50 placed by Player "A" is forfeited. However, the side bet prediction of "7" successfully predicted the total numerical value of the dealer's hand, and Player "A" is awarded a side payout of $90, corresponding to the side wager of $10 increased by a defined odds multiplier. All wagers and payouts are deducted from or added to a game balance of either money or points, as appropriate.

Figure 7D:
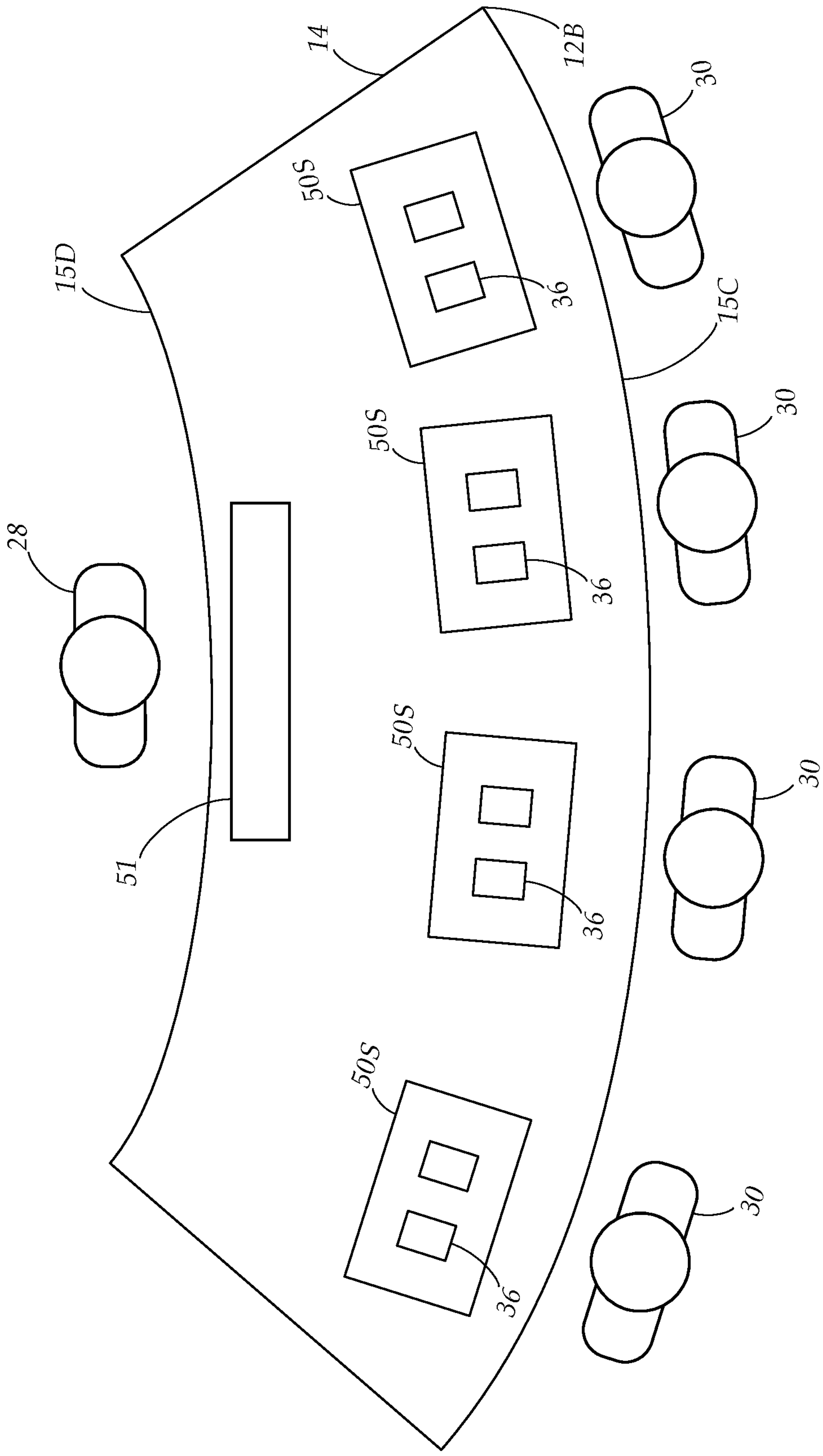
FIG. 7D is a diagrammatical top view of an electronic cooperative wagering table with integral output screens for playing the cooperative card wagering game, in accordance with an embodiment in the present disclosure.

Turning to FIG. 7B while also referring to FIG. 8, in an alternative embodiment, the cooperative card game system 49 may be employed within a gaming venue 68, whereby each user game device 50 is implemented as a dedicated card gaming station. Each user game device 50 may also have a payment module 55 for scanning credit cards, or receiving/dispensing tokens, coins, bills, or currency. The user game devices 50 and the game control server 52 may alternatively be operably connected via a local area network 54B or other wireless communication protocol. Referring to FIG. 7D, FIG. 8, and FIG. 1, in certain embodiments, the user game devices 50 may be incorporated into an electronic cooperative wagering table 12B which has a playing surface 14, whereby the user game devices 50 and the dealer game device 51 are disposed within the table 12 such that the output screens 50S are accessible through the playing surface 14. In other embodiments, the electronic cooperative wagering table 12B may contain a single user game device 50 operably configured to one or more of the output screens 50S. In certain embodiments, the features of the playing surfaces 14 of the cooperative wagering table 12, including the arcuate configuration of the dealer and community table edges 15D, 15C and the community line 22L may be replicated using one or more output screens 50S disposed across the playing surface 14 of the electronic cooperative wagering table.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. Other types of languages include XML, XBRL and HTML5. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. Each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flow diagrams depicted herein are just one example. There may be many variations to this diagram or the steps (or operations) described therein without departing from the spirit of the disclosure. For instance, the steps may be performed in a differing order and/or steps may be added, deleted and/or modified. All of these variations are considered a part of the claimed disclosure.

In conclusion, herein is presented systems and methods for playing a cooperative card wagering game. The disclosure is illustrated by example in the drawing figures, and throughout the written description. It should be understood that numerous variations are possible, while adhering to the inventive concept. Such variations are contemplated as being a part of the present disclosure.

What is claimed is:

1. A method for playing a cooperative card wagering game having a plurality of players and a dealer, comprising the steps of:

providing a physical cooperative wagering table comprising a playing surface, the playing surface having a dealer table edge, a community table edge, a community area, and a dealer area;

providing a deck comprising a plurality of cards, each card having a numerical value;

placing a wager by each player;

dealing three cards to each player by the dealer to form an individual hand for the player, retaining two cards by the dealer to form the dealer's hand, and hiding the numerical value of each card in the dealer's hand;

creating a community hand, each player contributing one of the cards from said player's individual hand to the community hand;

revealing the dealer's hand;

determining the total numerical value of the dealer's hand;

comparing the total numerical value of the dealer's hand with the total numerical value of the community hand, and determining a community result, whereby the community result is a community win if the community hand exceeds the dealer's hand, the community result is a community tie if the community hand equals the dealer's hand, and the community result is a community loss if the community hand is less than dealer's hand;

comparing the total value of the dealer's hand with the total value of each individual hand, and determining an individual result for each player, whereby the individual result is an individual win if the individual hand of said player exceeds the dealer's hand, the individual result is an individual tie if the individual hand of said player equals the dealer's hand, and the individual result is an individual loss if the individual hand of said player is less than the dealer's hand;

obtaining one of a plurality of game results for each player by considering the community result in combination with the individual result of said player, the plurality of game results comprising a player win game result, and a player loss game result;

forfeiting the wager of each player obtaining the player loss game result; and awarding a payout to each player obtaining the player win game result.

2. The method as recited in claim 1, wherein:

the step of placing a wager by each player is preceded by the step of positioning each player along the community table edge; and the step of dealing three cards to each player further comprises placing the cards of the individual hand of each player within the community area.

3. The method as recited in claim 2, wherein:

the physical cooperative wagering table further comprises a community line positioned between the dealer table edge and the community table edge, the community line dividing the playing surface between the dealer area and the community area; and the step of creating a community hand further comprises placing the community card contributed by each player in contact with the community line, and distinguishing the cards of the community hand from the cards remaining in the individual hands of each player.

4. The method as recited in claim 3, wherein:

the step of revealing the dealer's hand is followed by the step of determining a draw threshold, and drawing an additional dealer card and adding the additional dealer card to the dealer's hand if the total numerical value of the dealer's hand is equal to or less than the draw threshold.

5. The method as recited in claim 3, wherein:

the step of placing a wager by each player is followed by the step of placing a side bet and a side wager, making a prediction of a side outcome, the side outcome corresponding to the total numerical value of the dealer's hand;

the step of obtaining one of a plurality of game results is followed by the step of winning the side bet by each player who placed the side bet and successfully predicted the side outcome, and losing the side bet by each player who placed the side bet and failed to predict the side outcome;

the step of forfeiting the wager further comprises forfeiting the side wager by each player who lost the side bet; and the step of awarding a payout further comprises awarding a side payout to each player who won the side bet.

6. The method as recited in claim 3, wherein:

the community table edge is longer than the dealer table edge and has a convex configuration, the dealer table edge has a concave configuration, and the community line is substantially parallel with the community table edge and has an arcuate shape;

the step of positioning each player along the community table edge further comprises placing each player such that each player faces inwardly towards the convex dealer table edge, and providing each player with an unobstructed view of the community line; and the step of creating the community hand further comprises placing the community card on the community line and providing each player with an unobstructed view of the community card.

7. The method as recited in claim 2, wherein:

the plurality of game results further comprises a player push game result;

the step of obtaining one of a plurality of game results for each player further comprises obtaining the player push game result by each player who does not obtain the player win game result or the player loss game result; and the step of awarding a payout is followed by the step of returning the wager of each player who obtained the player push game result.

8. The method as recited in claim 1, wherein:

the game result obtained by the player is the player win game result if the community result is the community win or the community tie and the individual result of the player is the individual win, or if the community result is the community win and the individual result of the player is the individual tie.

9. The method as recited in claim 1, wherein:

the game result obtained by the player is the player loss game result if the individual result of the player is the individual loss and the community result is the community tie or the community loss, or if the individual result of the player is the individual tie and the community result is the community loss.

10. The method as recited in claim 1, wherein:

the plurality of game results further comprises a player push game result;

the game result obtained by the player is the player push game result if the community result is the community tie and the individual result is the individual tie, if the community result is the community loss and the individual result is the individual win, or if the community result is the community win and the individual result is the individual loss; and the step of awarding a payout is followed by the step of returning the wager of each player who obtained the player push game result.

11. A method for playing a cooperative card wagering game having a plurality of players and a dealer, comprising the steps of:

providing a physical cooperative wagering table comprising a playing surface, the playing surface having a dealer table edge, a community table edge, a community area, and a dealer area;

providing a deck comprising a plurality of cards, each card having a numerical value;

placing a wager by each player;

dealing three cards to each player by the dealer to form an individual hand for the player, retaining two cards by the dealer to form the dealer's hand, and hiding the numerical value of each card in the dealer's hand;

creating a community hand, each player contributing one of the cards from said player's individual hand to the community hand;

revealing the dealer's hand;

determining the total numerical value of the dealer's hand;

obtaining one of a plurality of community results by comparing the total numerical value of the dealer's hand with the total numerical value of the community hand, the community results comprising a community win and a community loss;

obtaining one of a plurality of individual results for each player by comparing the total value of the dealer's hand with the total value of the individual hand of the player, the individual results comprising an individual win and an individual loss;

obtaining one of a plurality of game results for each player by considering the community result in combination with the individual result of said player, the plurality of game results comprising a player win game result, and a player loss game result;

forfeiting the wager of each player obtaining the player loss game result; and awarding a payout to each player obtaining the player win game result.

12. The method as recited in claim 11, wherein:

the physical cooperative wagering table further comprises a community line positioned between the dealer table edge and the community table edge, the community line dividing the playing surface between the dealer area and the community area; and the step of creating a community hand further comprises placing the community card contributed by each player in contact with the community line, and distinguishing the cards of the community hand from the cards remaining in the individual hands of each player.

13. The method as recited in claim 11, wherein:

the community results further comprise a community tie, and the individual results further comprise an individual tie.

14. The method as recited in claim 13, wherein:

the community result is the community win if the community hand exceeds the dealer's hand, the community result is the community tie if the community hand equals the dealer's hand, and the community result is the community loss if the community hand is less than dealer's hand; and the individual result of each player is the individual win if the individual hand of said player exceeds the dealer's hand, the individual result is the individual tie if the individual hand of said player equals the dealer's hand, and the individual result is the individual loss if the individual hand of said player is less than the dealer's hand.

15. The method as recited in claim 13, wherein:

the plurality of game results further comprises a player push game result;

the step of obtaining one of a plurality of game results for each player further comprises obtaining the player push game result by each player who does not obtain the player win game result or the player loss game result; and the step of awarding a payout is followed by the step of returning the wager of each player who obtained the player push game result.

16. The method as recited in claim 13, wherein:

the game result obtained by the player is the player win game result if the community result is the community win or the community tie and the individual result of the player is the individual win, or if the community result is the community win and the individual result of the player is the individual tie.

17. The method as recited in claim 13, wherein:

the game result obtained by the player is the player loss game result if the individual result of the player is the individual loss and the community result is the community tie or the community loss, or if the individual result of the player is the individual tie and the community result is the community loss.

18. The method as recited in claim 13, wherein:

the plurality of game results further comprises a player push game result;

the game result obtained by the player is the player push game result if the community result is the community tie and the individual result is the individual tie, if the community result is a community loss and the individual result is an individual win, or if the community result is a community win and the individual result is an individual loss; and the step of awarding a payout is followed by the step of returning the wager of each player who obtained the player push game result.

19. The method as recited in claim 13, wherein:

the step of revealing the dealer's hand is followed by the step of determining a draw threshold, and drawing an additional dealer card and adding the additional dealer card to the dealer's hand if the total numerical value of the dealer's hand is equal to or less than the draw threshold.

20. The method as recited in claim 13, wherein:

the step of placing a wager by each player is followed by the step of placing a side bet and a side wager, making a prediction of a side outcome, the side outcome corresponding to the total numerical value of the dealer's hand;

the step of obtaining one of a plurality of game results is followed by the step of winning the side bet by each player who placed the side bet and successfully predicted the side outcome, and losing the side bet by each player who placed the side bet and failed to predict the side outcome;

the step of forfeiting the wager further comprises forfeiting the side wager by each player who lost the side bet; and the step of awarding a payout further comprises awarding a side payout to each player who won the side bet.

* * * * *